Aug. 19, 1969  C. B. DAUBENBERGER ET AL  3,462,161

HIGH PRESSURE SEALING GASKET

Filed March 20, 1967

INVENTORS:
CHARLES B. DAUBENBERGER
BILL J. BRYANT
CHARLES J. DAUBENBERGER
BY Elliott & Pastoriza
ATTORNEYS.

United States Patent Office 3,462,161
Patented Aug. 19, 1969

3,462,161
HIGH PRESSURE SEALING GASKET
Charles B. Daubenberger, Van Nuys, Bill J. Bryant, El Segundo, and Charles J. Daubenberger, Van Nuys, Calif., assignors to Da/Pro Rubber Company, Incorporated, Van Nuys, Calif., a corporation of California
Filed Mar. 20, 1967, Ser. No. 624,492
Int. Cl. F16j 15/00, 9/06; F16k 41/00
U.S. Cl. 277—166   3 Claims

ABSTRACT OF THE DISCLOSURE

A high pressure sealing gasket body carries within an annular channel on each opposite face an annular resilient sealing material surrounding the central opening in the gasket body. The geometry of the sealing material within the annular channel is such that there is provided a reduced width raised portion extending out of the plane of the gasket body. The reduced width defines with the channel walls, cavities on either side of the raised portion. When the gasket is pressed between opposing surfaces, the raised portion is expanded laterally to overlie the cavities. Pressure communicated to the cavities thus acts on the overlying portions of the resilient sealing material to urge it into tighter engagement with the surfaces and thus provide a high pressure seal.

---

This invention relates to gaskets and more particularly to a novel sealing gasket for sealing against high fluid pressures.

Heretofore, pressure sealing gaskets usually took the form of simple O-rings or gasket bodies carrying annular sealing material in the form of an O-ring or other configuration. The effectiveness of the seal depended upon the pressure exerted on the gasket in urging the same against a surface to be sealed. If the pressure sealed against became sufficiently high, the gaskets could be blown out of position or develop leaks at weak points.

Bearing the foregoing in mind, a primary object of this invention is to provide an improved sealing gasket which may be readily installed as in the case of conventional gaskets, but which is so designed as to provide an extremely high pressure seal against fluids, either gas or liquid, as well as moisture.

Another object is to provide a high pressure sealing gasket which becomes more effective with increasing pressure all to the end that a more reliable seal is provided.

Briefly, these and other objects and advantages of this invention are attained by providing a gasket body preferably in the form of a flat disc having on at least one face an annular channel. Within this channel there is provided resilient sealing material including an annular raised portion of reduced width extending out of the plane of the gasket body. This raised portion defines with a portion of the walls of the channel cavities on either side of the material when viewed in cross section.

When the gasket is sandwiched between two surfaces, the fastening pressure against the raised surface portion of the sealing material causes it to expand laterally such that portions of the material overlie the cavities. With this arrangement, pressure communicated into the cavities acts against the underside of the overlying portions thereby urging them into tighter engagement with the surface against which the seal is to be made. As a consequence, the effectiveness of the entire seal increases with increasing pressure.

A better understanding of the invention will be had by now referring to one embodiment thereof as illustrated in the accompanying drawings, in which.

Figure 1:
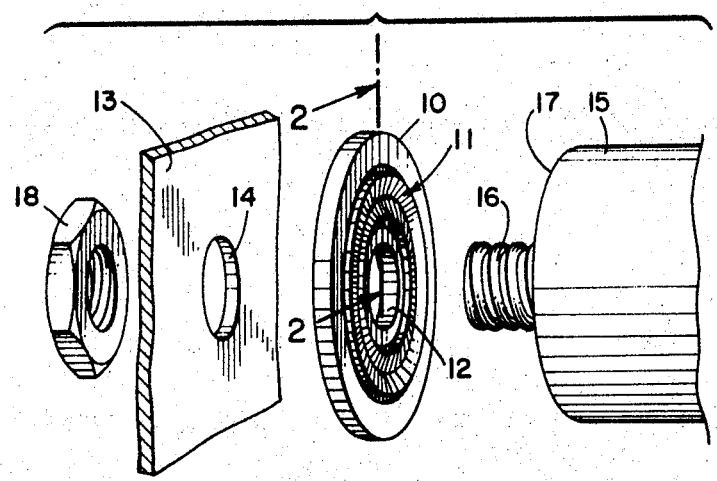
FIGURE 1 is an exploded view showing some components in conjunction with the improved sealing gasket prior to placement of the sealing gasket to effect a sealing operation.

Referring first to FIGURE 1, the improved sealing gasket comprises a gasket body 10 of flat disc configuration although other flat shapes may be employed. The body 10 carries an annular resilient sealing material 11 surrounding a central opening 12 and constituting the sealing means proper.

Merely by way of example, there is also illustrated in FIGURE 1 a first surface 13 which may constitute the front face of a panel or other enclosure provided with an opening 14 for cooperation with a member 15 having a central hollow tubular structure threaded as at 16 protruding from its front face 17. A nut 18 is arranged to be received on the threads 16 to lock the member 15 to the panel face. Suitable inlet lines for either gas or fluid or electrical conductors can pass through the threaded tube 16, opening in the gasket 12, and opening 14 in the panel face 13 so that communication is provided to the interior of the structure defined by the panel face 13 and thoroughly shielded against outside pressure and moisture when the gasket is in place.

Alternatively, if the enclosure defined by the panel face 13 is under high pressure within, the sealing gasket 10 will prevent leaks with respect to the connection of the member 15 to the panel face.

Figure 2:
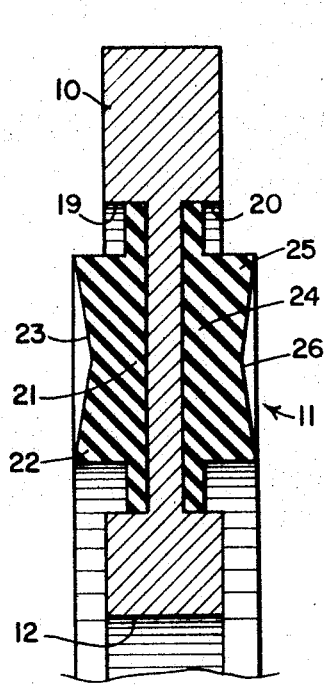
FIGURE 2 is a greatly enlarged fragmentary cross section of the sealing gasket taken in the direction of the arrows 2—2 of FIGURE 1; and, FIGURE 3 is a view similar to FIGURE 2 but illustrating the configuration of the sealing gasket when in operation for providing a seal about openings in opposed surfaces.

Referring now to the cross section of FIGURE 2, details of the sealing gasket 10 of FIGURE 1 will become evident. As shown, there are provided first and second annular channels 19 and 20 on the respective faces of the flat gasket body 10. These channels are respectively filled with resilient sealing material such as indicated at 21 for the channel 19. It will be noted that this material includes an annular raised portion 22 of reduced uniform width as viewed in cross section and preferably is provided with an annular depressed area 23 on its exposed surface. The raised portion 22 extends normally beyond the plane of the one face of the gasket body 10 as shown.

Similarly, the opposite channel 20 includes a resilient sealing material 24 having a reduced width raised portion 25 also provided with an annular depressed area 26.

With the configuration as described in FIGURE 2, when the sealing gasket 10 is positioned with respect to the members described in FIGURE 1 such as to be sandwiched between the faces 13 and 17, suitable squeezing force may be applied by tightening up of the nut 18 on the threads 16.

Figure 3:
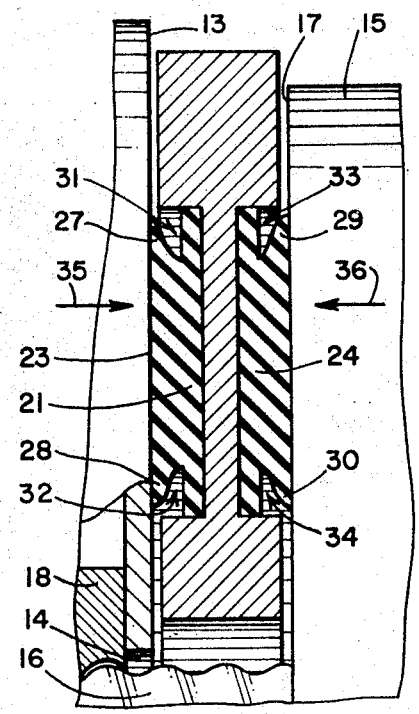

It will be evident in FIGURE 3 that as pressure is is applied to the opposing faces of the annular resilient sealing material, the outer and inner walls of each raised portion will be deformed and thus caused to expand radially outwardly and inwardly respectively, with respect to the axis of the opening of the gasket such as indicated at 27 and 28 for the raised portion 23, and 29 and 30 for the raised portion 26. The remaining portions of the sealing material and outer and inner side wall portions of the channels define cavities 31, 32, 33 and 34, respectively. The squeezing force applied to the gasket is indicated by the arrows 35 and 36.

In operation and with the gasket positioned as illustrated in FIGURE 3, it will be evident that any high pressure gas or liquid within the enclosure behind the front face 13 of the panel and any leakage about the threaded portion 16 of the member 15 will be communicated to the cavities 32 and 34 and will thus be exerted on the underside of the overlying portions 28 and 30 thereby urging these portions of the sealing material into tight engagement with the surfaces 13 and 17. Similarly, in the event that the exterior pressure is greater than the interior pressure, this pressure will be communicated to the cavities 31 and 33 to be exerted against the underside of the overlying portions 27 and 29 thereby urging these portions into tighter engagement with the opposed surfaces 13 and 17.

There is thus provided an extremely effective seal particularly against high pressures either existing within the central portion of the gasket or about the exterior of the gasket.

It will be noted in FIGURE 3 that the depressed areas 23 and 26 of the raised portions of the sealing material have been flattened as a consequence of engagement with the opposed surfaces. This arrangement results in an increase in the extent of the expansion of the overlying portions so as to provide a greater under area upon which pressure may act.

It will also be evident that any increasing of the pressure simply increases the force exerted on the undersides of the overlying portions so that the integrity of the sealing increases with increased pressure.

From the foregoing description, it will be evident that the present invention has provided an improved sealing gasket construction wherein the objects set forth are fully realized.

What is claimed is:

1. A high pressure sealing gasket comprising, in combination: a flat gasket body having a central opening and an annular channel in at least one face of said body surrounding said central opening; and an annular resilient sealing means carried in said channel and including an annular raised portion extending normally from beyond the plane of said face, the cross-sectional width of said raised portion between its outer and inner sides being uniform and less than the cross-sectional width of said channel whereby engagement of said raised portion with a first surface to which said gasket is to be applied with a given force deforms said raised portion to expand portions of its outer and inner sides in radial outward and inward directions respectively relative to the axis of said gasket opening to overlie at least partially remaining portions of said resilient means to define cavities between said outer and inner sides and the outer and inner walls defining said channels, whereby pressure communicated to said cavities acts on the underside of the overlying portions to urge said portions into tight sealing engagement with said first surface.

2. A sealing gasket according to claim 1, in which the exposed surface of said raised portion is depressed in its central area when viewed in cross-section such that upon engagement with said first surface under said given force, it will deform into a flat planar surface and increase the radial extent of said overlying portions.

3. A sealing gasket according to claim 2, in which the opposite face of said flat gasket body similarly includes an annular channel surrounding said central opening and carrying an annular resilient sealing means dimensioned in accordance with said first mentioned sealing means to provide a pressure-tight seal relative to a second surface brought into engagement with said last mentioned annular resilient sealing means when said gasket is sandwiched between said first surface and second surface.

References Cited

UNITED STATES PATENTS 2,513,178    6/1950    Jackson.

FOREIGN PATENTS 836,669    1/1959    Great Britain.
851,627    10/1960    Great Britain.

SAMUEL ROTHBERG, Primary Examiner

U.S. Cl. X.R.

227—180, 211